(12) United States Patent　　(10) Patent No.: US 9,922,571 B1
Greenleaf et al.　　　　　　　　(45) Date of Patent: Mar. 20, 2018

(54) VIRTUAL ADS-B FOR SMALL AIRCRAFT

(71) Applicant: Rockwell Collins, Inc., Cedar Rapids, IA (US)

(72) Inventors: William T. Greenleaf, Indialantic, FL (US); Daniel J. Clark, Melbourne, FL (US); Phillip L. Ellery, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 273 days.

(21) Appl. No.: 14/707,661

(22) Filed: May 8, 2015

(51) Int. Cl.
　　*G08G 5/00*　　(2006.01)
　　*H04L 29/08*　　(2006.01)
　　*H04W 76/00*　　(2018.01)

(52) U.S. Cl.
　　CPC ......... *G08G 5/0073* (2013.01); *G08G 5/0013* (2013.01); *G08G 5/0047* (2013.01); *G08G 5/0069* (2013.01); *H04L 67/12* (2013.01); *H04W 76/002* (2013.01)

(58) Field of Classification Search
　　CPC combination set(s) only.
　　See application file for complete search history.

(56) References Cited

U.S. PATENT DOCUMENTS

| | | | | |
|---|---|---|---|---|
| 2002/0004697 A1* | 1/2002 | Lai | ........................... | G01S 13/66 701/120 |
| 2003/0233192 A1* | 12/2003 | Bayh | ..................... | G01S 13/765 701/301 |
| 2006/0030994 A1* | 2/2006 | Lai | ........................ | G08G 5/0008 701/102 |
| 2007/0152814 A1* | 7/2007 | Stefani | .................... | G01S 19/14 340/539.22 |
| 2008/0158040 A1* | 7/2008 | Stayton | .................. | G01S 13/782 342/32 |
| 2008/0211709 A1* | 9/2008 | Smith | .................... | G01S 5/0027 342/32 |
| 2009/0134981 A1* | 5/2009 | Shafaat | ................ | G08G 5/0008 340/313 |
| 2009/0322589 A1* | 12/2009 | Dooley | ................. | G01S 13/765 342/37 |
| 2010/0090882 A1* | 4/2010 | Donovan | .............. | G01S 13/781 342/32 |
| 2011/0273322 A1* | 11/2011 | Melum | .............. | H04B 7/18506 342/42 |
| 2012/0001788 A1* | 1/2012 | Carlson | ................. | G01S 13/784 342/30 |

(Continued)

*Primary Examiner* — Thomas G Black
*Assistant Examiner* — Ana D Thomas
(74) *Attorney, Agent, or Firm* — Angel N. Gerdzhikov; Donna P. Suchy; Daniel M. Barbieri

(57) ABSTRACT

A small aircraft includes a computer system configured to determine its own location, establish a datalink with a ground station and send the location information to the ground station in an ADS-B compliant format. The ground station then transmits the ADS-B compliant small aircraft information as a virtual ADS-B signal from the small aircraft to air traffic controllers and local ADS-B capable aircraft. Likewise, a ground station incorporates a virtual ADS-B In function to receive ADS-B information in a non-ADS-B datalink channel. The ground station performs ADS-B In applications without the burden of the small aircraft carrying the actual ADS-B equipment.

20 Claims, 7 Drawing Sheets

(56) References Cited

U.S. PATENT DOCUMENTS

| | | | |
|---|---|---|---|
| 2012/0262339 A1* | 10/2012 | Garcia | G01S 5/10 |
| | | | 342/387 |
| 2013/0141268 A1* | 6/2013 | Getson | G01S 13/9303 |
| | | | 342/30 |
| 2014/0197981 A1* | 7/2014 | Hartley | G01S 13/74 |
| | | | 342/37 |
| 2016/0109567 A1* | 4/2016 | Watson | G01S 13/9303 |
| | | | 342/357.4 |
| 2016/0225267 A1* | 8/2016 | DeBusk | G08G 5/0013 |
| 2016/0225268 A1* | 8/2016 | DeBusk | H01Q 1/1207 |
| 2017/0069214 A1* | 3/2017 | Dupray | G08G 5/0021 |

* cited by examiner

VIRTUAL ADS-B FOR SMALL AIRCRAFT

FIELD OF THE INVENTIVE CONCEPTS

The inventive concepts disclosed herein are directed generally toward aircraft data traffic and more particularly toward unmanned aerial vehicle tracking.

BACKGROUND

Automatic dependent surveillance-broadcast (ADS-B) is a cooperative surveillance technology in which an aircraft determines its position via satellite navigation and periodically broadcasts that location, enhancing other's ability to track the broadcasting aircraft. ADS-B information is received by air traffic control ground stations as a replacement for secondary radar. It can also be received by other aircraft to provide situational awareness and allow self-separation.

ADS-B is an element of the United States Next Generation Air Transportation System but some U.S. aircraft, such as small aircraft and unmanned aerial vehicles (UAVs) or "drones", have limited payload to accommodate equipment needed to perform both ADS-B Out and ADS-B In and still perform expected tasks.

Consequently, it would be advantageous if an apparatus existed that is suitable for allowing aircraft to incorporate ADS-B functionality without incorporating additional communications equipment.

SUMMARY

Accordingly, the inventive concepts disclosed herein are directed to a novel method and apparatus for allowing aircraft to incorporate ADS-B functionality without incorporating additional communications equipment.

One embodiment of the inventive concepts disclosed herein includes a UAV or small aircraft having a computer system configured to determine its own location, establish a datalink with a remote station such as a ground station, airborne command station, or water based command station and send the location information to the remote station in an ADS-B compliant format. The remote station may then transmit the ADS-B compliant information as a virtual ADS-B signal from the UAV or small aircraft to air traffic controllers and local ADS-B capable aircraft.

In another embodiment of the inventive concepts disclosed herein, a station affiliated with the UAV or small aircraft incorporates a virtual ADS-B In function in a non-ADS-B high quality-of-service datalink channel (for example an Ethernet or WIFI connection) to receive appropriate ADS-B information corresponding to local ADS-B capable traffic in proximity to the UAV or small aircraft. The ground station can perform ADS-B In applications without the burden of the UAV or small aircraft carrying the actual ADS-B equipment.

It is to be understood that both the foregoing general description and the following detailed description are exemplary and explanatory only and are not restrictive of the inventive concepts claimed. The accompanying drawings, which are incorporated in and constitute a part of the specification, illustrate an embodiment of the inventive concepts and together with the general description, serve to explain the principles.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the subject matter disclosed, which is illustrated in the accompanying drawings. The scope of the inventive concepts is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
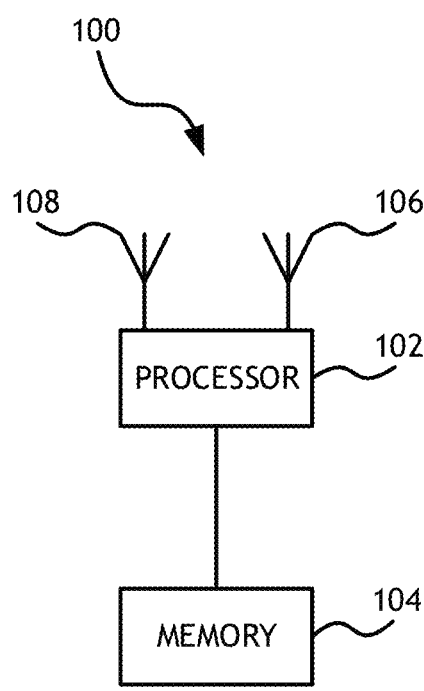
FIG. 1 shows a computer system suitable for implementing embodiments of the inventive concepts disclosed herein.

Referring to FIG. 1, a computer system 100 suitable for implementing embodiments of the inventive concepts disclosed herein is shown. The computer system 100 includes a processor 102, a non-transitory processor-readable memory 104 coupled with the processor 100 for storing computer executable code to configure the processor 100 to execute certain instructions as more fully described herein.

The computer system 100 also includes two or more antennas 106, 108, a first antenna 106 of the two or more antennas 106, 108 configured to receive a global satellite navigation system signal. The processor 102 receives the global satellite navigation system signal and produces an ADS-B compliant information packet comprising a location based on the global satellite navigation system signal and an intent based on a projected flight-path.

The system 100 may also include a second antenna 108 configured for data communication with a ground station. In at least one embodiment, the second antenna 108 is configured for cellular network compliant communication. In another embodiment, the second antenna 108 is configured for WIFI compliant communication. A person skilled in the art may appreciate that any non-ADS-B compliant communication methodology is envisioned as appropriate for data communication with the ground station.

In another embodiment, a ground station includes a computer system 100 having one or more antennas 106, 108, a first antenna 106 of the one or more antennas 106, 108 configured to receive signals from an aircraft; the signal comprising ADS-B data such as location information derived from a global satellite navigation system and intent information in the form of an ADS-B Out compliant data packet.

In another embodiment, the processor 100 receives data through the first antenna 106 corresponding to location information derived from a global satellite navigation system and intent information from an aircraft, and compiling such data into an ADS-B Out compliant data packet.

In either case, the processor 100 then transmits the ADS-B Out compliant data packet in a channel suitable for ADS-B Out broadcasting thereby creating a "virtual" ADS-B Out signal corresponding to aircraft without ADS-B Out transmission equipment. In one embodiment, ADS-B Out data packets are broadcast via ADS-B Out compliant channels including radio frequency (RF) pulses in the 1090 MHz range. Pulses should be understood to include squitter, or random pulses, pulse pairs and other non-solicited messages. In other embodiments, ADS-B Out data packets may be transmitted via non-ADS-B specific channels. The virtual ADS-B Out signal may be broadcast through the first antenna 106 or a second antenna 108 configured for the purpose.

Figure 2:
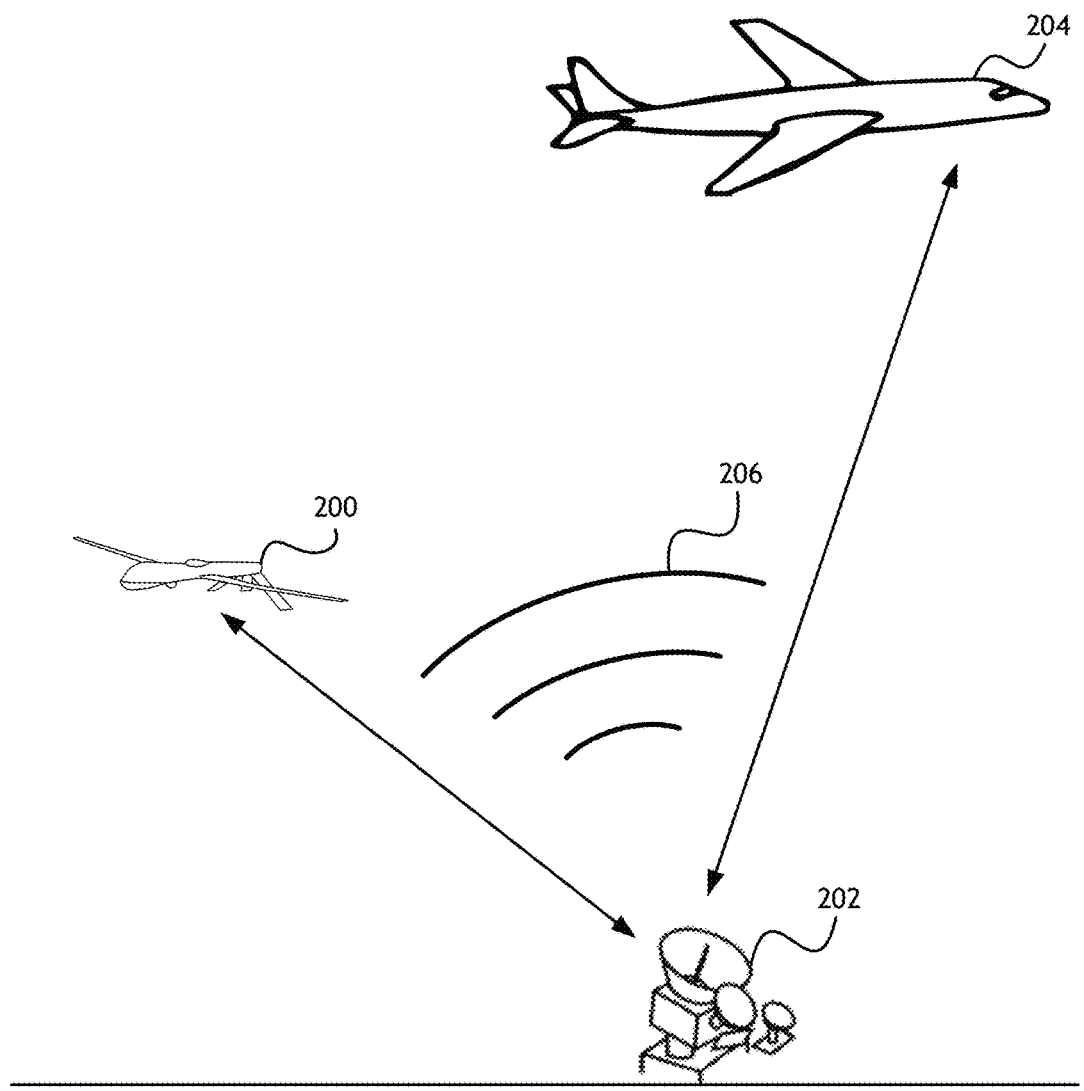
FIG. 2 shows an environmental view of an embodiment of the inventive concepts disclosed herein.

Referring to FIG. 2, an environmental view of an embodiment of the inventive concepts disclosed herein is shown. A small aircraft 200 (such as a UAV) including an embodiment of the inventive concepts disclosed herein receives a global satellite navigation system signal and produces an ADS-B compliant information packet comprising a location based on the global satellite navigation system signal and an intent based on a projected flight-path. The small aircraft 200 then sends the ADS-B compliant data packet to a ground station 202. Alternatively, the small aircraft 200 may send the location and intent information the ground station 202 directly.

The ground station 202 receives either the ADS-B compliant signal or the location and intent information from the small aircraft 200 through a data link connection such as a cellular data network, WIFI, or other non-ADS-B data connection. Where necessary, the ground station 202 may produce a virtual ADS-B Out signal 206 based on the location and intent information.

The ground station 202 broadcasts the virtual ADS-B Out signal 206 corresponding to an ADS-B Out signal that would be broadcast by the small aircraft 200 if the small aircraft 200 were equipped for such broadcast. The virtual ADS-B Out signal 206 may be treated as any other ADS-B Out signal by local aircraft 204.

Figure 3:
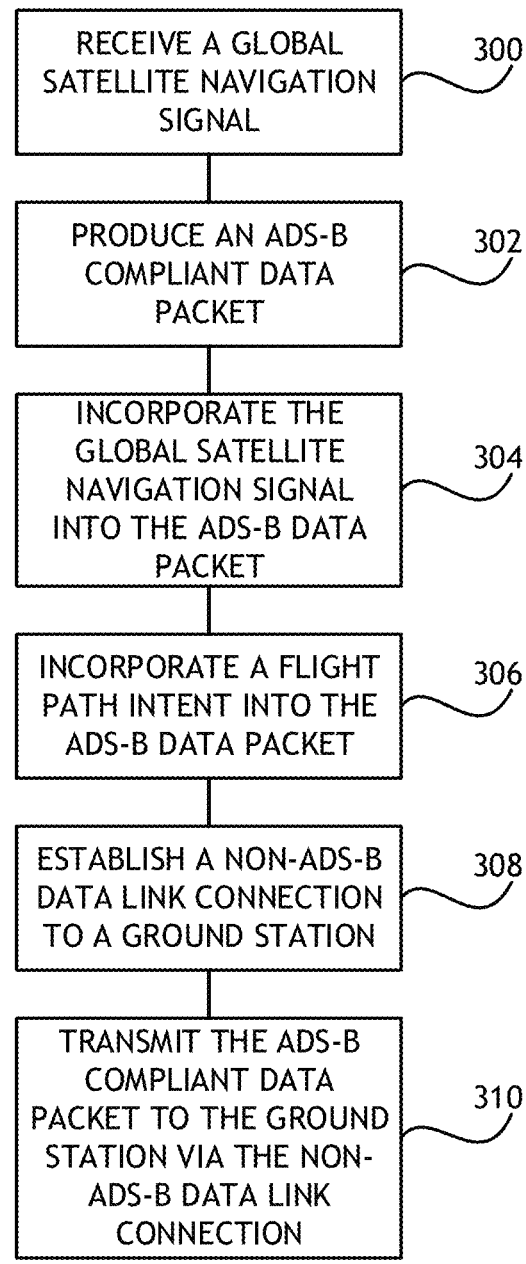
FIG. 3 shows a flowchart according to one embodiment of the inventive concepts disclosed herein.

Referring to FIG. 3, a flowchart of a method for including ADS-B Out functionality in a small aircraft without ADS-B broadcasting capability according to one embodiment of the inventive concepts disclosed herein is shown. The method comprises the small aircraft receiving 300 a global satellite navigation signal, producing 302 an ADS-B Out compliant data packet and incorporating 304 the global satellite navigation signal into such data packet. The small aircraft may also incorporate 306 a flight-path intent into the ADS-B Out compliant data packet. The small aircraft then establishes 308 a data link connection in a channel available to the small aircraft such as through a cellular network or WIFI, but in any event through a channel other than traditional ADS-B channels. The small aircraft then transmits 310 the ADS-B Out compliant data packet to a ground station through the data link connection.

Figure 4:
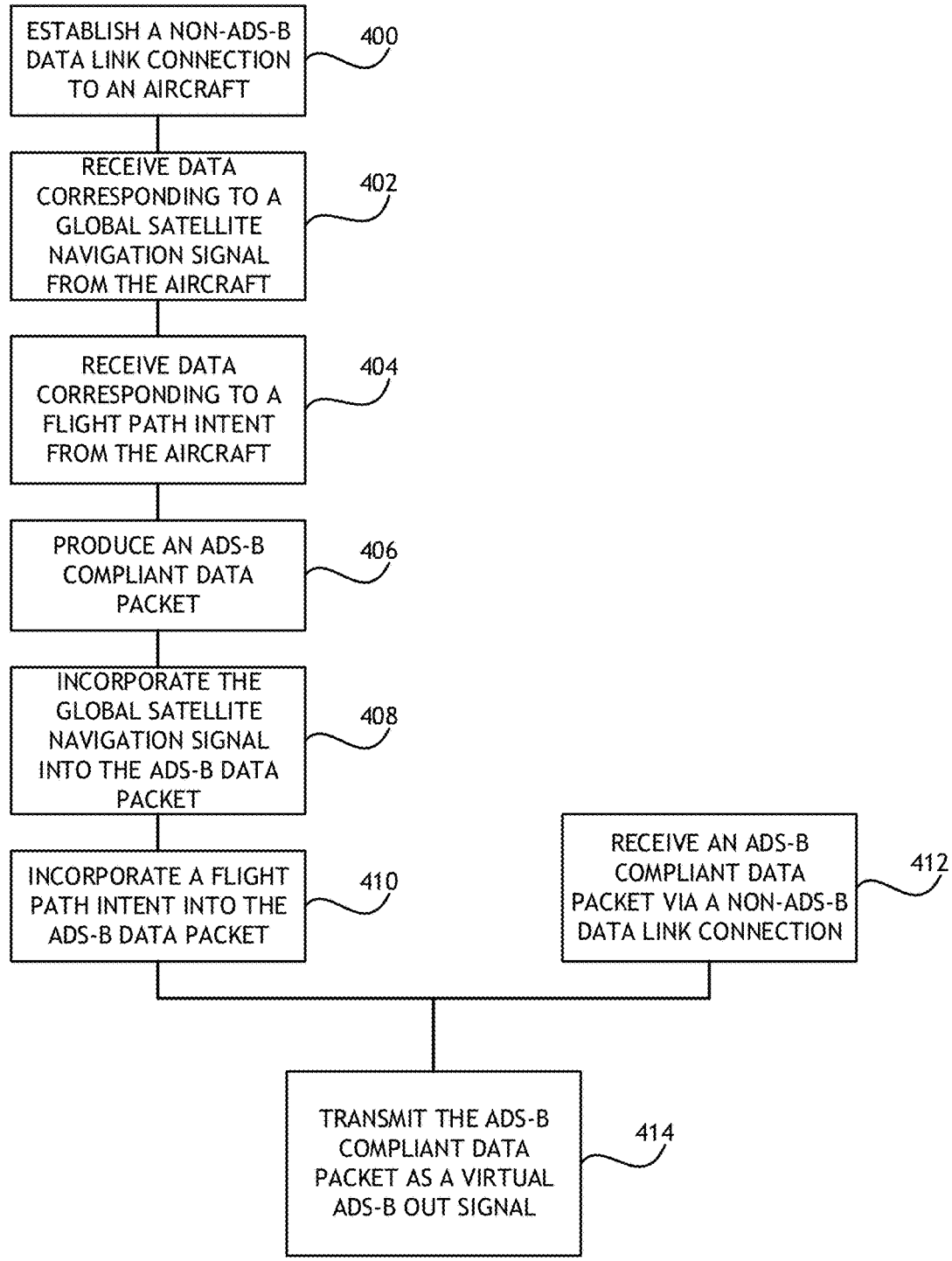
FIG. 4 shows a flowchart according to embodiments of the inventive concepts disclosed herein.

Referring to FIG. 4, a flowchart according to a method according to an embodiment of the inventive concepts disclosed herein is shown. At 400, a ground station establishes a data link connection to a small aircraft and receives at 402 global satellite navigation data from the small aircraft. Further, at 404, the ground station may receive flight path intent data from the small aircraft. The data link connection is a non-ADS-B Out channel such as a cellular network, WIFI, or any other appropriate transmission channel.

Based on the data received from the small aircraft, at 406 the ground station produces an ADS-B Out compliant data packet and at 408 and 410 incorporates the global satellite navigation data and flight path intent data into the ADS-B Out compliant data packet. At 414, the ground station broadcasts the ADS-B Out compliant data packet as a virtual ADS-B Out signal to one or more local ADS-B In equipped aircraft. Such signal may be in the form of an ADS-R (rebroadcast) signal.

The ground station may also receive at 412 an ADS-B Out compliant data packet produced by a small aircraft, through a non-ADS-B Out channel; the ADS-B Out compliant data packet including global satellite navigation data and flight path intent data. The ground station may transmit at 414 the ADS-B Out compliant data packet as a virtual ADS-B Out signal to local ADS-B In equipped aircraft.

Figure 5:
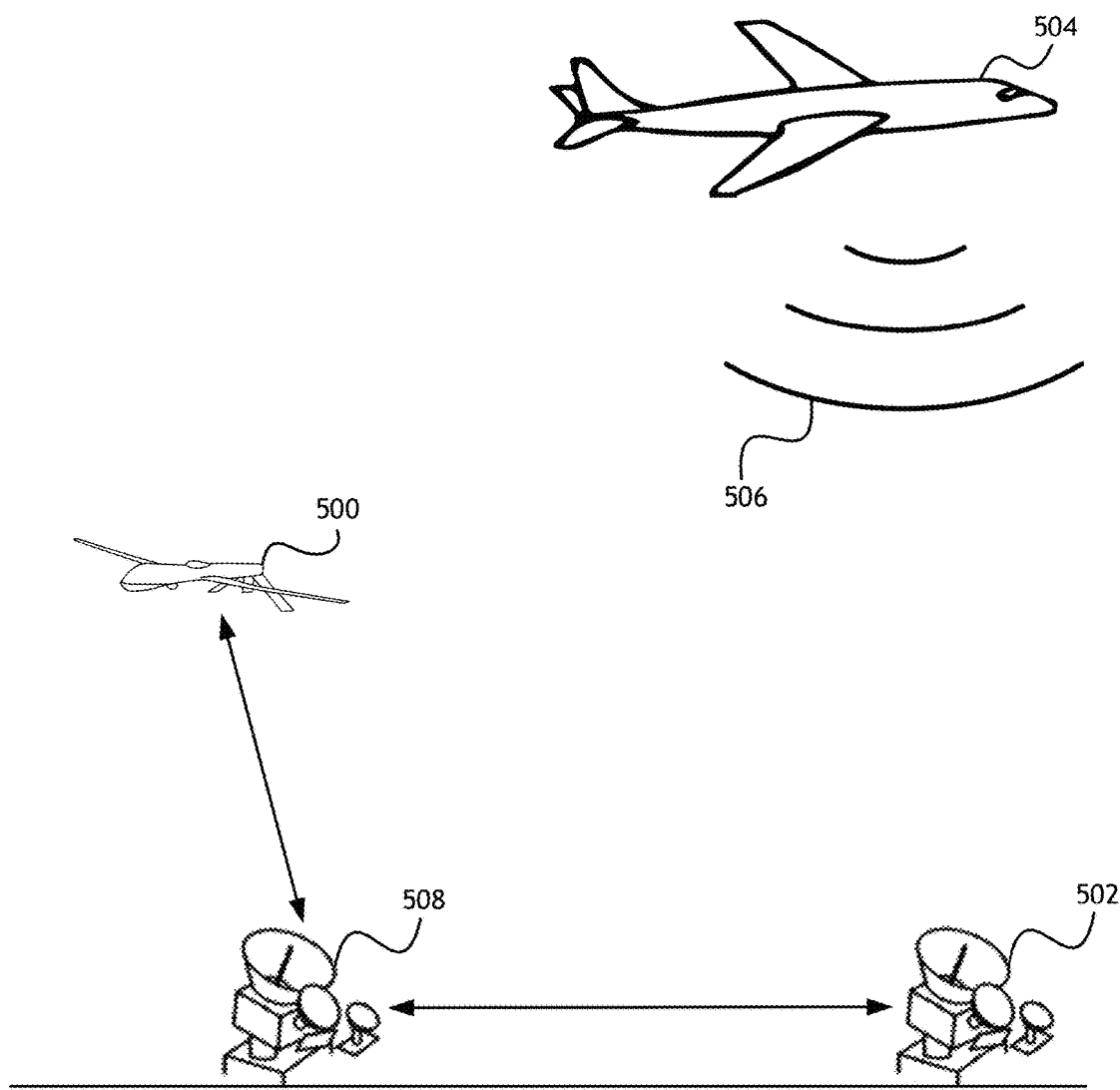
FIG. 5 shows an environmental view of an embodiment of the inventive concepts disclosed herein.

Referring to FIG. 5, an environmental view of an embodiment of the inventive concepts disclosed herein is shown. One or more large aircraft 504 equipped for ADS-B communications and operations transmits an ADS-B compliant signal 506 to a ground station 502 or small aircraft control station 508 equipped to receive such ADS-B compliant signal 506.

The ground station 502 or small aircraft control station 508 is equipped to execute one or more ADS-B In applications. ABS-B In applications parse the data contained in the ADS-B In signal 506 and convert such data into usable information pertaining to the one or more large aircraft 504 that can be incorporated into aircraft systems.

Where the ADS-B compliant signal 506 is received and processed by a small aircraft control station 508, the small aircraft control station 508 establishes a non-ADS-B data link connection to a small aircraft 500 (such as a UAV) such as through a cellular data network, or WIFI connection. The usable information pertaining to the one or more large aircraft 504 derived from the ADS-B compliant signal 506 is then transmitted to the small aircraft 500 through the non-ADS-B data link connection.

Alternatively, where the ADS-B compliant signal 506 is received and processed by a ground station 502, the ground station 502 may transfer a data packet embodied in the ADS-B compliant signal 506 to a small aircraft control station 508 through a data communication network. The small aircraft control station 508 then derives usable information pertaining to the one or more large aircraft 504 from the data packet and establishes a non-ADS-B data link connection to the small aircraft 500. The usable information pertaining to the one or more large aircraft 504 derived from the data packet is then transmitted to the small aircraft 500 through the non-ADS-B data link connection.

Figure 6:
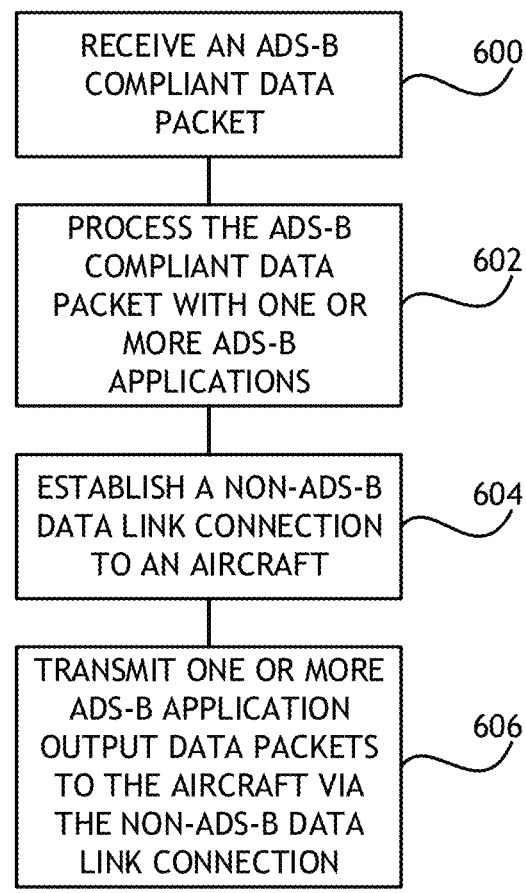
FIG. 6 shows a flowchart according to embodiments of the inventive concepts disclosed herein.

Referring to FIG. 6, a flowchart according to embodiments of the inventive concepts disclosed herein is shown. At 600, a ground station or small aircraft control station receives an ADS-B In compliant signal from one or more large aircraft. At 602, data embodied in the ADS-B In compliant signal is processed via one or more ADS-B applications to derive data pertaining to a location pertinent to the one or more large aircraft.

Where a ground station receives the ADS-B In compliant signal, the data embodied in the ADS-B In compliant signal is transferred to a small aircraft control station where the data is processed at 602. At 604, the small aircraft control station establishes a non-ADS-B data link connection to a small aircraft and at 606 transmits the location and intention data pertaining to the one or more large aircraft derived from the ADS-B In signal.

Alternatively, at 606, the small aircraft control station may incorporate data derived from the ADS-B In signal via the one or more ADS-B applications into a small aircraft control signal and the small aircraft control signal is transmitted to control the small aircraft.

Figure 7:
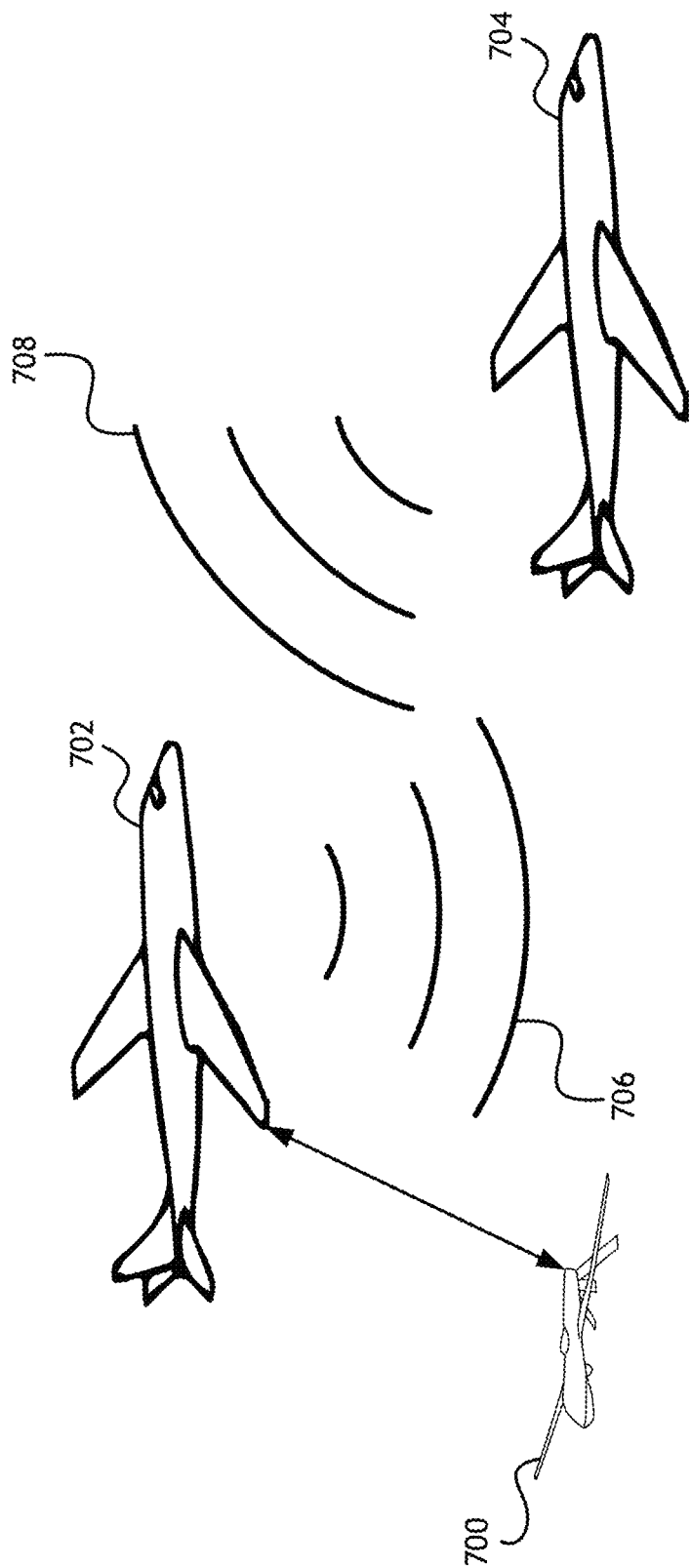
FIG. 7 shows an environmental view of an embodiment of the inventive concepts disclosed herein.

Referring to FIG. 7, an environmental view of an embodiment of the inventive concepts disclosed herein is shown.

One or more large aircraft 704 equipped for ADS-B communications and operations broadcasts an ADS-B compliant signal 708 to an airborne remote station 702 equipped to receive such ADS-B compliant signal 708.

The airborne remote station 702 is equipped to execute one or more ADS-B In applications. ABS-B In applications parse the data contained in the ADS-B compliant signal 708 and convert such data into usable information pertaining to the one or more large aircraft 704 that can be incorporated into aircraft systems.

The airborne remote station 702 may transfer a data packet embodied in the ADS-B compliant signal 708 to a small aircraft control station 708 through a data link connection such as a cellular network or WIFI connection. Alternatively, the airborne remote station 702 may broadcast a data signal 706 including the data packet. The data signal 706 may include ADS-R complaint data or any other data structure suitable for delivering the data packet.

It is believed that the inventive concepts disclosed herein and many of its attendant advantages will be understood by the foregoing description of embodiments of the inventive concepts disclosed herein, and it will be apparent that various changes may be made in the form, construction, and arrangement of the components thereof without departing from the scope and spirit of the inventive concepts or without sacrificing all of its material advantages. The form herein before described being merely an explanatory embodiment thereof, it is the intention of the following claims to encompass and include such changes.

What is claimed is:

1. An aircraft computer system comprising:
   at least one processor;
   a global satellite navigation system antenna coupled with the at least one processor;
   a data link antenna coupled with the at least one processor;
   a non-transitory processor-readable memory coupled with the at least one processor storing processor-executable code for causing the at least one processor to:
      receive a global satellite navigation signal through the global satellite navigation system antenna;
      produce an automatic dependent surveillance-broadcast (ADS-B) Out compliant data packet;
      incorporate a location derived from the global satellite navigation signal into the ADS-B Out compliant data packet;
      establish a data link connection to a ground station through the data link antenna, the data link connection comprising a non-ADS-B compliant channel; and
      transmit the ADS-B Out compliant data packet to the ground station via the data link connection for broadcast in an ADS-B Out compliant channel,
   wherein the aircraft is not ADS-B equipped.

2. The aircraft computer system of claim 1, wherein the non-transitory processor-readable memory further stores processor-executable code configured to cause the at least one processor to incorporate a flight path intent into the ADS-B Out compliant data packet.

3. The aircraft computer system of claim 1, wherein the non-ADS-B Out compliant channel comprises a cellular network.

4. The aircraft computer system of claim 1, wherein the non-ADS-B Out compliant channel comprises a WIFI connection.

5. A remote station computer system comprising:
   at least one processor;
   one or more antennas coupled with the at least one processor;
   a non-transitory processor-readable memory coupled with the at least one processor, and storing processor-executable code for causing the at least one processor to:
      establish a data link connection to an aircraft through the one or more antennas, the data link connection comprising a non-automatic dependent surveillance-broadcast (ADS-B) compliant channel;
      receive a data packet via the data link connection;
      produce a virtual ADS-B Out signal based on the data packet; and
      broadcast the virtual ADS-B Out signal through one of the one or more antennas in an ADS-B Out compliant channel as if the virtual ADS-B Out signal originated from the aircraft.

6. The remote station computer of claim 5, wherein the data packet comprises an ADS-B Out compliant data packet comprising location information derived form a global satellite navigation system.

7. The remote station computer of claim 6, wherein the ADS-B Out compliant data packet further comprises flight path intent information.

8. The remote station computer of claim 5, wherein the non-ADS-B Out compliant channel comprises a cellular network.

9. The remote station computer of claim 5, wherein the non-ADS-B Out compliant channel comprises a WIFI connection.

10. The remote station computer of claim 5, wherein the ADS-B Out compliant channel comprises radio frequency (RF) pulses.

11. The remote station computer of claim 5, wherein the ADS-B Out compliant channel comprises an RF band signal broadcast at 1090 MHz.

12. The remote station computer of claim 5, wherein:
    the data packet comprises location information derived form a global satellite navigation system; and
    the processor-executable code is further configured to cause the at least one processor to produce an ADS-B Out compliant data packet including information pertinent to location associated with the location information.

13. The remote station computer of claim 12, wherein:
    the data packet further comprises flight path intent information; and
    the processor-executable code is further configured to cause the at least one processor to incorporate the flight path intent information into the ADS-B Out compliant data packet.

14. A remote station computer system comprising:
    at least one processor;
    one or more antennas coupled with the at least one processor;
    a non-transitory processor-readable memory coupled with the at least one processor storing processor-executable code for causing the at least one processor to:
       receive an automatic dependent surveillance-broadcast (ADS-B) In compliant signal through the one or more antennas, the ADS-B In compliant signal associated with at least one ADS-B equipped aircraft;
       execute one or more ADS-B applications;
       process the ADS-B In compliant signal with the one or more ADS-B applications;

establish a data link connection to a non-ADS-B enabled aircraft through the one or more antennas, the data link connection comprising a non-ADS-B compliant channel; and transmit data derived from the ADS-B In compliant signal to the non-ADS-B enabled aircraft as if the data originate from onboard ADS-B applications.

15. The remote station computer of claim 14, wherein the ADS-B In compliant signal comprises location information derived form a global satellite navigation system.

16. The remote station computer of claim 15, wherein the ADS-B In compliant signal further comprises flight path intent information.

17. The remote station computer of claim 14, wherein the non-ADS-B compliant channel comprises a cellular network.

18. The remote station computer of claim 14, wherein the non-ADS-B compliant channel comprises a WIFI connection.

19. The remote station computer of claim 14, wherein the processor-executable code is further configured to cause the at least one processor to incorporate the data derived from the ADS-B In compliant signal into one or more aircraft control systems.

20. The remote station computer of claim 19, wherein:
the one or more aircraft control systems produce an aircraft control signal; and the processor-executable code is further configured to cause the at least one processor to transmit the aircraft control signal to the aircraft via the data link connection.

\* \* \* \* \*